P. H. GOGGIN.
INTERNAL COMBUSTION ENGINE.
APPLICATION FILED OCT. 1, 1912.

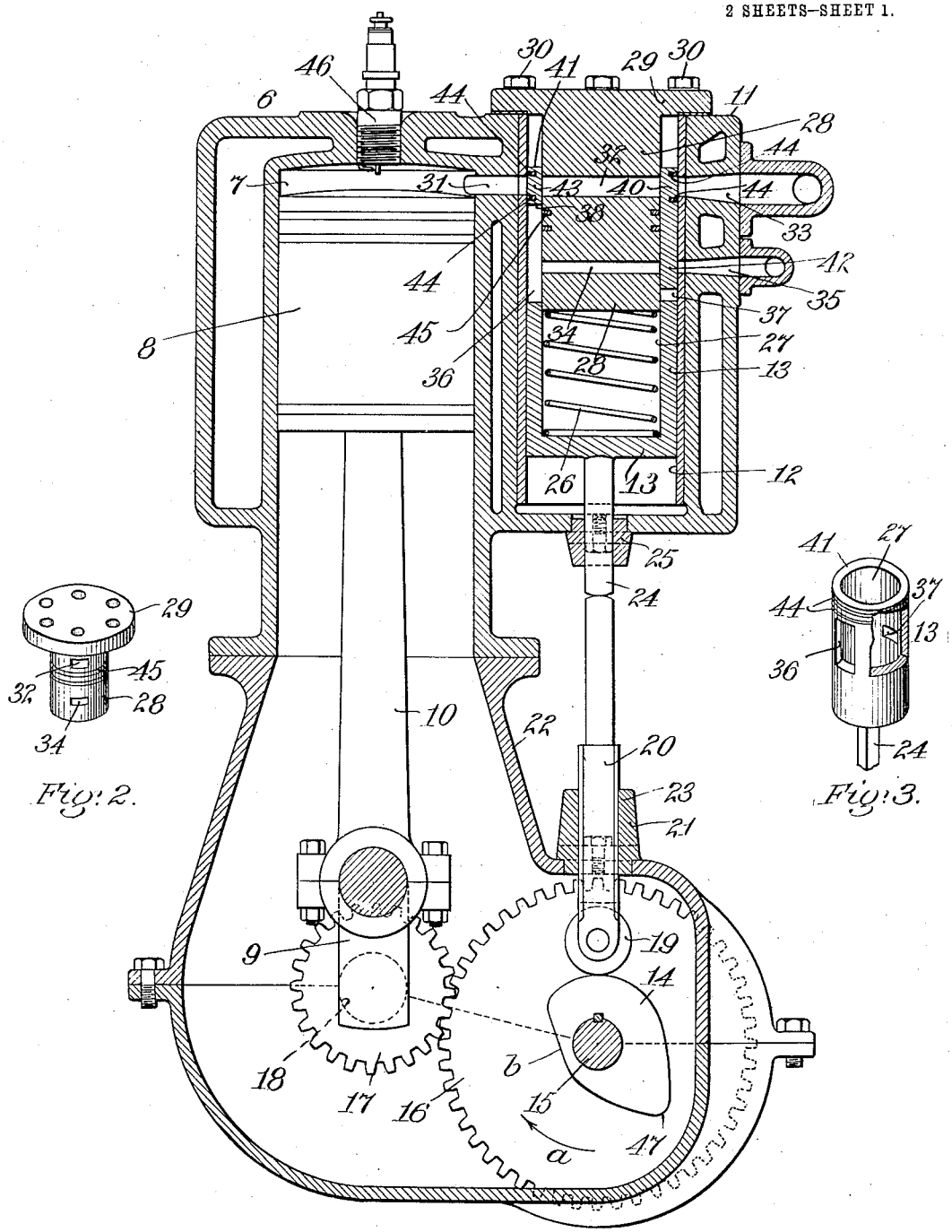

1,094,554.

Patented Apr. 28, 1914.

2 SHEETS—SHEET 2.

Witnesses.
Leonard A. Powell
Sydney E. Taft

Inventor.
Pauline Hartman Goggin,
by her attorney, Charles J. Gooding.

UNITED STATES PATENT OFFICE.

PAULINE HARTMAN GOGGIN, OF SALEM, MASSACHUSETTS.

INTERNAL-COMBUSTION ENGINE.

1,094,554.  Specification of Letters Patent.  Patented Apr. 28, 1914.

Application filed October 1, 1912. Serial No. 723,363.

*To all whom it may concern:*

Be it known that I, PAULINE HARTMAN GOGGIN, a citizen of the United States, residing at Salem, in the county of Essex and State of Massachusetts, have invented new and useful Improvements in Internal-Combustion Engines, of which the following is a specification.

This invention relates to improvements in internal combustion engines and especially to the four cycle type of engine.

The object of the invention is to reduce the cost and simplify the construction of internal combustion engines by providing a single valve of the reciprocating type, which is adapted to control both the admission of combustible mixture to the explosion cylinder and the discharge of the burnt gases from said cylinder.

The object is further to provide an engine having a normally stationary member provided with inlet and exhaust passages and adapted to coöperate with the valve to direct the combustible mixture and the burnt gases in their respective directions, said member being detachably mounted relatively to said valve and explosion cylinder in order to permit the removal thereof, whereby the passages in said member, the ports in said valve and the passage connecting the valve chest with the explosion cylinder may all be easily reached to permit inspection or cleaning thereof.

The invention consists in the combination and arrangement of parts whereby the above objects and certain other objects hereinafter appearing may be attained as set forth in the following specification and particularly pointed out in the claims.

Figure 4:
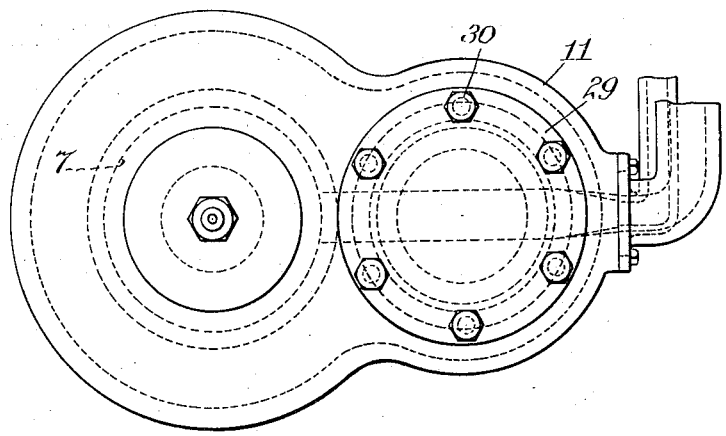
Figures 5, 6:
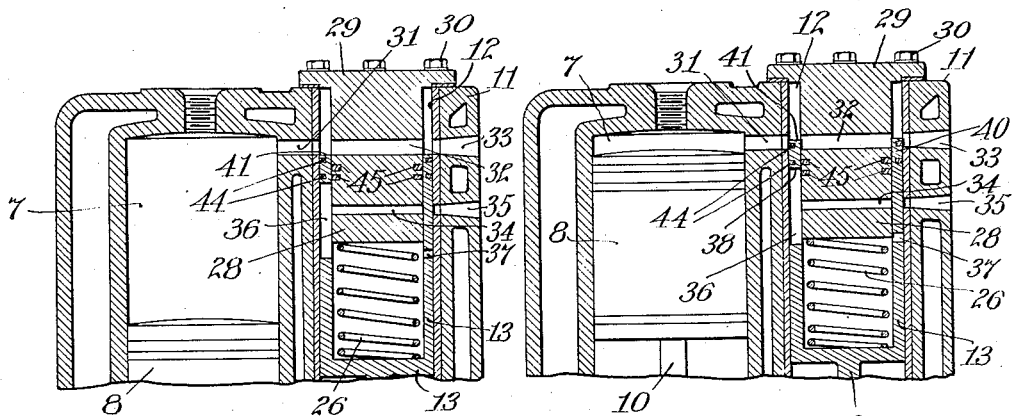
Figure 7:
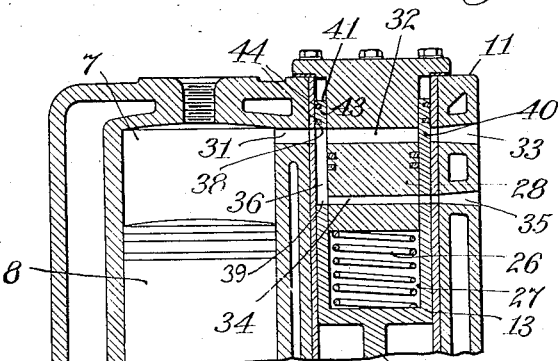

Referring to the drawings: Figure 1 is a sectional elevation through the explosion cylinder valve chest and crank casing of an internal combustion engine embodying my invention. Fig. 2 is a perspective view of the valve chest cap or closure and the cylindrical stem suspended therefrom. Fig. 3 is a perspective view of the cylindrical reciprocating valve. Fig. 4 is a plan view of the cylindrical coöperating valve chest of the engine illustrated in Fig. 1. Fig. 5 is a detail sectional view of the explosion cylinder, valve chest and portions of the piston and valve in the positions which they would occupy at the beginning of the exhaust stroke of the crank shaft and piston. Fig. 6 is a section similar to Fig. 5 with the moving parts shown in the positions which they occupy at the end of the exhaust stroke of the crank shaft. Fig. 7 is a section similar to Fig. 5 illustrating the piston in about the center of the intake stroke.

Like numerals refer to like parts throughout the several views of the drawings.

In the drawings, 6 is a casing comprising an explosion or piston cylinder 7, of the usual four cycle type, having a piston 8 arranged to be reciprocated therein by a crank 9 and connecting rod 10, said casing 6 also comprises a valve chest 11 preferably formed in one piece with said casing and provided with a cylindrical valve chamber 12 arranged parallel with said explosion chamber 7, and in which is located a hollow valve 13, which may be reciprocated therein in any suitable manner, but preferably in one direction by a cam 14 secured to the cam shaft 15, which is operably connected through gears 16 and 17 to the crank shaft 18, the proportions of said gears 16 and 17 being such that said cam shaft will be rotated at one-half the speed at which the shaft 18 is rotated.

The cam 14 is engaged by a cam roll 19 rotatably mounted upon the cam slide 20 adapted to reciprocate in a guide 21 on the crank casing 22 of said engine. The slide 20 is preferably rectangular in cross section and moves in a correspondingly shaped hole 23 in the guide 21. Furthermore said slide 20 is adapted to engage the lower end of a valve stem 24, which is connected with the valve 13, said valve stem being formed preferably rectangular in cross section and engaging a correspondingly shaped guide 25, which is secured to the valve chest 11 and prevents rotation of said valve within said valve chest. To move said valve 13 in the opposite direction a spring 26 is provided which may be connected in any suitable manner to said valve, but is preferably placed within a cylindrical recess 27 in said valve 13, bearing at one end thereof against one end of said valve, the other end of said spring engaging the end of a cylindrical stem 28 which projects concentrically into the cylindrical recess 27 and engages the walls thereof, said stem being suspended from a cap 29 adapted to close the end of said valve chest 11 and detachably held in place by screws 30.

The explosion cylinder 7 and the valve chest 11 are connected at their upper ends by a passage or port 31 and through this passage the combustible mixture is drawn and the burnt gases are discharged at their proper times in the operation of said engine. Alining with the passage 31 and preferably extending transversely through the stem 28 is an exhaust passage 32, said passage 32 also alining with the exhaust chamber 33 formed within the valve chest 11 and preferably diametrically opposite the port 31. Another passage 34 preferably arranged transversely of the stem 28 and in the present instance parallel with the passage 32 constitutes an inlet passage, which alines with an inlet chamber 35 formed in the valve chest 11 and through said chamber and said passage a combustible mixture is drawn, when so permitted by the valve 13, into the explosion cylinder 7.

The cylindrical valve 13 is provided with ports 36 and 37 arranged in the side wall of said valve upon opposite sides of the center thereof. The port 36 is of a length sufficient to connect the passage 31 with the passage 34 when the valve 13 is raised to the proper position, while the port 37 is substantially equal in area to the passage 34, consequently when the valve 13 has been raised until said port 36 connects the passage 31 with the passage 34, that is to say, the upper end 38 of the port 36 alines with the upper surface of the passage 31, and the lower end 39 of the port 36 alines with the bottom wall of the passage 34 (see Fig. 7) and with the chamber 35, the combustible gases will be drawn into the explosion cylinder 7 and when properly compressed they are discharged as hereinafter described.

During such time as the ports 36 and 37 remain in the positions just referred to the exhaust chamber 33 and the exhaust passage 32 are separated and disconnected from each other by the portion 40 of the cylindrical valve 13 (see Fig. 7). Upon the continued movement of the valve downwardly, the upper edge 41 thereof is depressed until it alines with the lower walls of the passages 31 and 32 and the mouth of the exhaust chamber 33 (see Fig. 5), whereupon the burnt gases from the explosion cylinder 7 may be discharged outwardly through said passages and into said exhaust chamber, the passage 34 and the inlet chamber 35 being at this time disconnected by a partition 42, while the passage 34 is disconnected from the port 31 by an abutment 43.

To insure a perfect fit and to prevent the gases from the cylinder passing between the outer wall of the valve 13 and the adjacent wall of the chamber 12, piston rings 44 are provided, while to prevent the gases from passing between the interior wall of said valve and the adjacent wall of said stem 28 piston rings 45 are interposed therebetween.

The operation of the device hereinbefore specifically described is as follows: Assuming now that the various parts of the engine are in the positions illustrated in Fig. 1, which illustrates both of the passages 32 and 34 disconnected from the explosion cylinder 7 by the abutment 43, and in this case there being no outlet for the explosion chamber the gases contained therein will be compressed by the upward movement of the piston 8 which is now shown in its uppermost position. At this time the usual firing instrumentalities are operated and through the spark plug 46 the compressed charge is fired which forces the piston 8 downwardly to the position illustrated in Fig. 5. Through the rotation of the crank shaft 18, caused by said explosion, the cam shaft 15 is rotated by means of the gears 16 and 17 which in turn revolve the cam 14 in the direction of the arrow "$a$" to bring the lowermost point "$b$" on said cam into engagement with the roll 19 and permitting the spring 26 to force the valve 13 downwardly until the edge 41 of said valve alines with the bottom walls of the passages 31 and 32, as shown in Fig. 5, and in this position said valve remains for a short period of time or at least long enough for the piston 8, during its next stroke, to force the burnt gases in the explosion cylinder 7 outwardly through the passages 31 and 32 and exhaust chamber 33 and upon the completion of said stroke, as is represented by Fig. 6, the valves will have been elevated sufficiently to almost, if not entirely, close the exhaust passage. During the next stroke of the piston the cam 14 is revolved until its highest point 47 engages the roll 19 as in Fig. 7, thus elevating the valve 13 until the port 36 connects the passage 31 with the passage 34 and the port 37 connects the passage 34 with the chamber 35 (see Fig. 7), the partition 40 being at this time between the passage 32 and chamber 33. The entire suction caused by the next stroke of the piston 8, which is the downward movement thereof, causes the combustible gases from the chamber 35 to be drawn therefrom through the port 37, passage 34, port 36 and passage 31 into the cylinder or explosion chamber 7 after which the passage 31 will be closed by the movement of said valve and the charge in said explosion chamber will be compressed and fired as hereinbefore described.

Having thus described my invention, what I claim and desire by Letters Patent to secure is:

1. An internal combustion engine having, in combination, an explosion cylinder, a valve chest provided with inlet and exhaust ports, a cap for said valve chest having a stem projecting into said valve chest, said stem having passages alining with said inlet and exhaust ports, a valve located within said valve chest between said stem and the walls of said valve chest, and means to reciprocate said valve to alternately connect said inlet and exhaust ports with said explosion cylinder.

2. An internal combustion engine having, in combination, an explosion cylinder, a valve chest provided with inlet and exhaust chambers, said valve chest also having a single passage leading therefrom into said explosion cylinder, a hollow reciprocating valve adapted to be moved to alternately connect said passage with said inlet and exhaust chambers and means adapted to project into and fit said valve provided with passages adapted to aline with said inlet and exhaust passages respectively.

3. An internal combustion engine having, in combination, a piston cylinder, a valve chest having a passage communicating with said piston cylinder, a detachable cylindrical stem suspended within said valve chest provided with inlet and exhaust passages, and a cylindrical valve arranged to reciprocate within said valve chest intermediate the walls thereof and said stem to alternately connect said inlet and exhaust passages with the passage communicating with said piston cylinder.

4. An internal combustion engine having, in combination, an explosion cylinder, a valve chest provided with inlet and exhaust chambers, a stationary stem concentrically suspended within said valve chest, said stem having an inlet and an exhaust passage therethrough alining with said inlet and exhaust chambers respectively, a reciprocatory valve within said valve chest adapted to be moved to connect said inlet passage with said explosion cylinder and close said exhaust passage, said valve also adapted to be moved to close said inlet passage and to connect said exhaust passage with said explosion cylinder.

5. An internal combustion engine having, in combination, an explosion cylinder, a cylindrical valve chest arranged parallel with said explosion cylinder and provided with a passage at the upper end thereof communicating with the upper end of said explosion cylinder, said valve chest also having inlet and exhaust ports, a cylindrical valve located within said valve chest having an opening at one end and provided with ports in the side wall thereof, a detachable closure for said valve chest provided with a cylindrical stem adapted to project into the open end of said valve, said stem having passages therethrough alining with said inlet and exhaust ports, and means to actuate said cylindrical valve to alternately connect the passages in said stem with their respective ports, and with the passage communicating with said explosion cylinder.

6. An internal combustion engine having, in combination, an explosion cylinder, a valve chest connected at its upper end by a passage communicating with the upper end of said explosion cylinder, said valve chest also having inlet and exhaust ports, a closure for said valve chest provided with a stem adapted to project into said valve chest, said stem having passages arranged transversely therethrough alining with said inlet and exhaust ports, and a valve arranged within said chest intermediate the walls thereof and said stem, adapted to be actuated to alternately connect said inlet port with its passage and said explosion cylinder, and said exhaust port with its respective passage and said explosion cylinder.

In testimony whereof I have hereunto set my hand in presence of two subscribing witnesses.

PAULINE HARTMAN GOGGIN.

Witnesses:
SYDNEY E. TAFT,
ANNIE J. DAILEY.